United States Patent [19]
Chibata et al.

[11] 3,898,127
[45] Aug. 5, 1975

[54] PROCESS FOR PREPARING UROCANIC ACID

[75] Inventors: Ichiro Chibata, Osaka; Tetsuya Tosa, Kyoto; Tadashi Sato; Kozo Yamamoto, both of Osaka, all of Japan

[73] Assignee: Tanabe Seiyaku Co. Ltd., Osaka, Japan

[22] Filed: Oct. 9, 1973

[21] Appl. No.: 404,289

[30] Foreign Application Priority Data
Oct. 16, 1972 Japan.............................. 47-103377

[52] U.S. Cl. ........................ 195/29; 195/28; 195/68
[51] Int. Cl............................................. C12d 13/06
[58] Field of Search .......... 195/63, 68, DIG. 11, 29, 195/30

[56] References Cited
UNITED STATES PATENTS
3,788,950  1/1974  Hicks et al....................... 195/63 X
3,791,926  2/1974  Chibata et al. ....................... 195/30

OTHER PUBLICATIONS
Neal Franks, "Catabolism of L—Arginine," *Biochimica et Biophysica Acta* 252 (1971) pages 246–254.

*Primary Examiner*—Lionel M. Shapiro
*Assistant Examiner*—Robert J. Warden
*Attorney, Agent, or Firm*—Bierman & Bierman

[57] ABSTRACT

At least one acrylic monomer is polymerized in an aqueous suspension containing an L-histidine ammonialyase-producing microorganism. The acrylic monomers employed in the present invention include acrylamide, N,N'-lower alkylene-bis-acrylamide and bis(acrylamidomethyl)ether. The resultant immobilized L-histidine ammonialyase-producing microorganism is subjected to enzymatic reaction with L-histidine or its acid addition salt. Urocanic acid is produced. Alternatively, DL-histidine or its acid addition salt may be employed instead of L-histidine thereby producing urocanic acid and D-histidine.

21 Claims, No Drawings

PROCESS FOR PREPARING UROCANIC ACID

This invention relates to a novel process for preparing urocanic acid. More particularly, it relates to the production of urocanic acid or a mixture of urocanic acid and D-histidine by enzymatic reaction of an immobilized L-histidine ammonialyase-producing microorganism with L- or DL-histidine.

Urocanic acid is useful as an ultraviolet ray intercepting agent.

It is known in the art that urocanic acid can be prepared by the steps of extracting L-histidine ammonialyase from *Pseudomonas fluorescens*, and reacting the enzyme with L-histidine (Biochemical Preparations 4(1955), page 50). However, this method is disadvantageous for large scale production. Urocanic acid produced according to this method is contaminated with the enzyme, microbial cells, nutrient sources and/or proteins. Accordingly, additional steps of removing the enzyme and other contaminants from the product are required to recover urocanic acid in high purity. Moreover, when the enzymatic reaction is completed, the reaction solution is boiled and/or acidified to denature the enzyme, and the enzyme precipitates are filtered off. Thus, L-histidine ammonialyase can be used only once and must be discarded thereafter. On the other hand, it is known that D-histidine is prepared by optical resolution of DL-histidine, or by assymmetric hydrolysis of DL-histidine amide or N-acyl-DL-histidine with an enzyme such as amidase or acylase. In the commercial production of D-histidine, however, these methods are also disadvantageous because of complicated procedures involved therein and/or low yield of D-histidine to be obtained.

As a result of investigations, we have now found that an L-histidine ammonialyase-producing microorganism immobilized with a semipermeable membrane can be employed advantageously in producing urocanic acid from L-histidine or an acid addition salt thereof, or a mixture of urocanic acid and D-histidine from DL-histidine or an acid addition salt thereof.

According to the present invention, urocanic acid or a mixture of urocanic acid and D-histidine can be prepared by the steps of polymerizing at least one acrylic monomer in an aqueous suspension containing an L-histidine ammonialyase-producing microorganism, and subjecting the resultant immobilized L-histidine ammonialyase-producing microorganism to enzymatic reaction with L-histidine, DL-histidine or an acid addition salt thereof.

The polumerization reaction of the present invention can be carried out in the presence of a polymerization initiator and a polymerization accelerator. Potassium persulfate, ammonium persulfate, vitamin $B_2$ and Methylene Blue are suitable as the polymerization initiator. On the other hand, $\beta$-(dimethylamino)-propionitrile and N,N,N',N'-tetramethyl-ethylenediamine are employed as polymerization accelerators. It is preferred to carry out the reaction at 5° to 80°c, especially at 10° to 50°C. The reaction may be completed within 10 to 60 minutes. In some cases, in order to carry out the subsequent enzymatic reaction advantageously, it may be preferred to heat the L-histidine ammonialyase-producing microorganism at an elevated temperature such as 60° to 80°C for 30 minutes prior to the immobilization reaction thereof, or to heat the immobilized L-histidine ammonialyase-producing microorganism at 60° to 80°C for about 30 minutes. The acrylic monomers which are suitable for use in the present invention include acrylamide, N,N'-lower alkylene-bis-acrylamide and bis(a-crylamidomethyl) ether. For the purpose of the present invention, it is suitable to entrap the L-histidine ammonialyase-producing microorganism with a polymer obtained from one or two monomers mentioned above, particularly with a copolymer of acrylamide and N,N'-lower alkylene-bis-acrylamide or bis(a-crylamidomethyl) ether or with a homopolymer of N,N'-lower alkylene-bis-acrylamide or bis(a-crylamidomethyl)-ether. N,N'-methylene-bis-acrylamide and N,N'-propylene-bis-acrylamide are preferably employed as the N,N'-lower alkylene-bis-acrylamide. Moreover, preferred examples of L-histidine ammonialyase-producing microorganisms which are employed in the present invention include *Achromobacter aquatilis* OUT(Faculty of Technology, Osaka University, Japan) 8003, *Achromobacter liquidum* IAM(Institute of Applied Microbiology, Tokyo University, Japan) 1667, *Agrobacterium radiobacter* IAM 1526, *Flavobacterium flavescens* IFO(Institute for Fermentation, Osaka, Japan) 3085, and *Sarcina lutea* IAM 1099. All of these microorganisms are publicly available from the above-menthioned depositories. In this connection, however, it should be noted that the present invention is not limited to the use of these specific microorganisms, but includes within its scope the use of all of L-histidine ammonialyase-producing microorganisms. The polymerization reaction of the present invention serves to tightly entrap each of the microorganisms into the lattice of the polymer thereby affording high enzymatic activity for a long period of time.

Urocanic acid can be prepared by enzymatic reaction of the resultant immobilized microorganism with L-histidine or an organic or inorganic acid addition salt thereof. Alternatively, urocanic acid and D-histidine can be prepared by using DL-histidine or an organic or inorganic acid addition salt thereof instead of L-histidine. Suitable examples of the organic or inorganic acid addition salt of L- or DL-histidine include hydrochloride, sulfate, nitrate, acetate, etc. It is preferred to carry out the enzymatic reaction at 0° to 60°C, especially at about 37°C. The enzymatic reaction of the present invention can be accelerated by carrying it out in the presence of a surfactant. For example, when an aqueous 0.25 M L-histidine solution is reacted with 1 g of an immobilized L-histidine ammonialyase-producing microorganism at 37°C for 1 hour in the presence or absence of cetyltrimethyl ammonium bromide, urocanic acid is produced as shown in Table 1.

Table 1

| | Amount ($\mu$g) of urocanic acid produced | |
|---|---|---|
| Immobilized microorganisms | No addition | Amount of cetyltrimethyl ammonium bromide added 0.05w/v % |
|---|---|---|
| Achromobacter aquatilis OUT 8003 | 847 | 938 |
| Achromobacter liquidum IAM 1667 | 946 | 1054 |
| Agrobacterium radiobacter IAM 1526 | 148 | 479 |
| Flavobacterium flavescens IFO 3085 | 575 | 745 |
| Sarcina lutea IAM 1099 | 26 | 194 |

Any one of a cationic surfactant(e.g., cetyltrimethyl ammonium bromide), an anionic surfactant(e.g., triethanolamine laurylsulfate) and a nonionic surfactant-(e.g., glyceryl monoalkylate) is employed for this purpose. Preferred concentration of the surfactant in the reaction solution is about 0.005 to 0.5 w/v %. Moreover, in carrying out the enzymatic reaction of the invention, the enzymatic activity of the immobilized microorganism can be stabilized effectively by adding a metal ion to the reaction solution. For this purpose, it is preferred to use $10^{-4}$ to $10^{-1}$M of the metal ion such as magnesium, calcium, zinc and ferric ion.

The concentration of a substrate employed is not critical in the present invention. For example, L- or DL-histidine is dissolved in water at any concentration. The aforementioned immobilized microorganism is suspended in the solution of L- or DL-histidine, and the suspension is stirred. After the reaction is completed, the mixture is filtered or centrifuged to recover the immobilized microorganism for subsequent use. Urocanic acid or a mixture of urocanic acid and D-histidine is recovered from the filtrate or supernatant solution. The optimum reaction condition for complete conversion of L-histidine or DL-histidine, respectively, to urocanic acid or a mixture of urocanic acid and D-histidine can be readily obtained by adjusting the reaction time. Alternatively, the enzymatic reaction of the invention can be performed by a column method. The column method enables the reaction to be carried out in a successive manner. For example, the immobilized microorganism is charged into a column, and an aqueous solution of L- or DL-histidine is passed through the column at a suitable flow rate. An aqueous solution containing urocanic acid or a mixture of urocanic acid and D-histidine is obtained as the effluent. Urocanic acid is recovered by a known method per se such as, for example, by adjusting the effluent to pH 4–5. Further, the mixture of urocanic acid and D-histidine is readily separated into each one of the components by a conventional method such as, for example, treatment with an ion-exchange resin. In carrying out the enzymatic reaction, the conversion rate of L-histidine(or DL-histidine) to urocanic acid (or urocanic acid and D-histidine) mainly depends upon the enzymatic potency of the immobilized microorganism, the temperature or the reaction time. In case of a column method, however, the optimum reaction condition for complete conversion of L-or DL-histidine, respectively, to urocanic acid or a mixture of urocanic acid and D-histidine can be readily obtained by adjusting the flow rate of the substrate solution.

In any case, the immobilized microorganism of the present invention retains a high level of the enzymatic activity during the reaction. Moreover, due to the sufficient durability of the enzymatic activity thereof, the immobilized microorganism of the invention can be used repeatedly for the enzymatic reaction.

Practical and presently-preferred embodiments of the present invention are shown in the following Examples. In this specification, the terminology "lower alkylene" should be interpreted as referring to alkylene groups having one to four carbon atoms.

EXAMPLE 1

1. An aqueous nutrient medium(pH 7.0) containing the following ingredients is prepared:

| Glucose | 1 | w/v % |
|---|---|---|
| Dipotassium phosphate | 0.2 | w/v % |
| Monopotassium phosphate | 0.05 | w/v % |
| Ammonium chloride | 0.1 | w/v % |
| Magnesium sulfate 7 hydrate | 0.02 | w/v % |
| Yeast extract | 0.1 | w/v % |
| L-histidine hydrochloride | 0.02 | w/v % |

*Achromobacter liquidum* IAM 1667 is inoculated into 200 ml of the medium. The medium is cultivated at 30°C for 24 hours under shaking. Then, the medium is centrifuged. The microbial cells thus collected are suspended in 12 ml of a physiological saline solution, and the suspension is heated at 70°C for 30 minutes. 2.25 g of acrylamide, 0.12 g of N,N'-methylene-bis-acrylamide, 1.5 ml of 5% β-(dimethylamino)-propionitrile and 1.5 ml of 2.5% potassium persulfate are added to the suspension. Then, the suspension is allowed to stand at 25°C for 10 minutes. The insoluble product is ground and washed with a physiological saline solution. 25 g of an immobilized preparation of *Achromobacter liquidum* IAM 1667 are obtained.

2. 25 g of the immobilized preparation of *Achromobacter liquidum* IAM 1667 are charged into a 1.6 cm × 25.5 cm column, and 500 ml of an aqueous 0.25 M L-histidine hydrochloride solution(pH 9.0) are passed through the column at 37°C at the flow rate of 6 ml/hr. 500 ml of the effluent is adjusted to pH 4.7 with concentrated sulfuric acid. Then, the effluent is allowed to stand at 5°C overnight. The crystalline precipitate is collected by filtration, washed with ice-water, and dried. 21.5 g of urocanic acid 2 hydrate are obtained. M.P. 225°C.

EXAMPLE 2

An immobilized preparation of *Achromobacter liquidum* IAM 1667 is prepared in the same manner as described in Example 1-(1). 25 g of the immobilized preparation are charged into a 1.6 cm × 25.5 cm column. An aqueous 0.25 M L-histidine hydrochloride solution(pH 9.0) is passed through the column at 37°C at a flow rate as shown in Table 1. The urocanic acid content in the effluent is assayed spectrophotometrically from the optical density thereof at 277 mμ (molecular extinction coefficient $\epsilon = 1.88 \times 10^4$, pH 7.4), and the percentage conversion of L-histidine to urocanic acid is calculated therefrom. The results are shown in Table 2.

Table 2

| Flow rate (ml/hr) | Conversion(%) to urocanic acid |
|---|---|
| 40 | 50 |
| 20 | 70 |
| 10 | 100 |
| 6 | 100 |

EXAMPLE 3

25 g of an immobilized preparation of *Achromobacter liquidum* IAM 1667 prepared in the same manner as described in Example 1-(1) are charged in a 1.6 cm × 25.5 cm column. An aqueous 0.25 M L-histidine hydrochloride solution(pH 9.0) containing magnesium chloride is passed through the column at 37°C at a flow rate as shown in Table 3. The urocanic acid content in the effluent is assayed in the same manner as described in Example 2, and the percentage conversion of L-histidine to urocanic acid is calculated therefrom. The results are shown in Table 3.

Table 3

| Operation time (days) | Conversion(%) to urocanic acid Amount of magnesium chloride added | | | |
|---|---|---|---|---|
| | No addition | | 0.01 M | |
| | Flow rate | | Flow rate | |
| | 40 ml/hr | 10 ml/hr | 40 ml/hr | 10 ml/hr |
| 3 | 50 | 100 | 50 | 100 |
| 6 | 48 | 92 | 50 | 100 |
| 9 | 40 | 78 | 50 | 100 |
| 12 | 36 | 70 | 50 | 100 |
| 15 | 33 | 60 | 50 | 100 |
| 18 | 25 | 40 | 50 | 95 |
| 21 | 20 | 38 | 50 | 95 |

EXAMPLE 4

25 g of an immobilized preparation of *Achromobacter liquidum* IAM 1667 prepared in the same manner as described in Example 1-(1) are suspended in 500 ml of an aqueous 0.25 M L-histidine hydrochloride solution(pH 9.0). The suspension is stirred at 37°C for a certain period of time. The urocanic acid content in the suspension is assayed in the same manner as described in Example 2, and the percentage conversion of L-histidine to urocanic acid is calculated therefrom. The results are shown in Table 4.

Table 4

| Reaction time (hr.) | Conversion(%) to urocanic acid |
|---|---|
| 3 | 10 |
| 6 | 20 |
| 24 | 80 |
| 30 | 90 |
| 44 | 100 |

EXAMPLE 5  1. *Agrobacterium radiobacter* IAM 1526 is inoculated into 300 ml of an aqueous nutrient medium(pH 7.0) containing the same ingredients as described in Example 1-(1). The medium is cultivated at 30°C for 24 hours under shaking. Then, the medium is centrifuged. The microbial cells thus collected are suspended in 12 ml of a physiological saline solution. 2.25 g of acrylamide, 0.12 g of N,N'-methylene-bis-acrylamide, 1.5 ml of 5% β-(dimethylamino)-propionitrile and 1.5 ml of 2.5% potassium persulfate are added to the suspension. Then, the suspension is allowed to stand at 25°C for 10 minutes. The insoluble product is ground and washed with a physiological saline solution. 24 g of an immobilized preparation of Agrobacterium IAM 1526 are obtained.

2. 24 g of the immobilized preparation of *Agrobacterium radiobacter* IAM 1526 are charged into a 2.2 cm × 17 cm column. 500 ml of an aqueous 0.25 M L-histidine hydrochloride solution(pH 9.0) containing 0.05% cetyltrimethyl ammonium bromide are passed through the column at 37°C at the flow rate of 5 ml/hr. 500 ml of the effluent thus obtained are adjusted to pH 4.7 with concentrated sulfuric acid, and then treated in the same manner as described in Example 1-(2). 20.8 g of urocanic acid 2 hydrate are obtained. M.P. 225°C.

EXAMPLE 6

An immobilized preparation of *Achromobacter liquidum* IAM 1667 is prepared in the same manner as described in Example 1-(1). 25 g of the immobilized preparation are charged into a 1.6 cm × 25.5 cm column. 200 ml of 0.25 M DL-histidine hydrochloride solution(pH 9.0) are passed through the column at 37°C at the flow rate of 5 ml/hr. 200 ml of the effluent thus obtained is passed through the column of a weak cation exchange resin(manufactured by Rohm & Haas Co., under the trade name "Anberlite IRC-50"). Then, the effluent obtained from the column of the weak cation exchange resin is concentrated to dryness under reduced pressure. The residue obtained is recrystallized from water. 4.5 g of urocanic acid 2 hydrate are obtained. M.p. 225°C.

The column of the weak cation exchange resin is washed with water, and then eluted with an aqueous 5% ammonia solution. The eluate is concentrated to dryness under reduced pressure. The residue thus obtained is recrystallized from water. 3.5 g of D-histidine are obtained. M.p 287°C Optical rotation $[\alpha]_D^{25}= +38.7°$.

EXAMPLE 7

3 g of the microbial cells of *Achromobacter liquidum* IAM 1667 are suspended in 12 ml of a physiological saline solution. The suspension is heated at 70°C for 30 minutes. 2.25 g of acrylamide, 120 mg of N,N'-propylene-bis(acrylamide), and 1.5 ml of 2.5% potassium persulfate are added to the suspension. Then, the suspension is allowed to stand at 25°C for 10 minutes. The insoluble product is ground and washed with a physiological saline solution. 25 g of an immobilized preparation of *Achromobacter liquidum* IAM 1667 are obtained.

25 g of the immobilized preparation of *Achromobacter liquidum* IAM 1667 are suspended in 500 ml of an aqueous 0.25 M L-histidine hydrochloride solution(pH 9.0). The suspension is stirred at 37°C for a certain period of time. The urocanic acid content in the suspension is assayed in the same manner as described in Example 2, and the percentage conversion of L-histidine to urocanic acid is calculated therefrom. The results are shown in Table 5.

Table 5

| Reaction time (hr) | Conversion(%) to urocanic acid |
|---|---|
| 8 | 25 |
| 24 | 73 |
| 40 | 95 |
| 48 | 100 |

EXAMPLE 8

3 g of the microbial cells of *Achromobacter liquidum* IAM 1667 are suspended in 12 ml of a physiogical saline solution. The suspension is heated at 70°C for 30 minutes. 2.25 g of acrylamide, 120 mg of bis(acrylamidomethyl) ether, 1.5 ml of 5% β-(dimethylamino)-propionitrile and 1.5 ml of 2.5% potassium persulfate are added to the suspension. Then, the suspension is allowed to stand at 25°C for 10 minutes. The insoluble product is ground and washed with a physiological salline solution. 23 g of an immobilized preparation of *Achromobacter liquidum* IAM 1667 are obtained.

23 g of the immobilized preparation of *Achromobacter liquidum* IAM 1667 are suspended in 500 ml of an aqueous 0.25 M L-histidine acetate solution(pH 9.0). The suspension is stirred at 37°C for a certain period of time. The urocanic acid content in the suspension is assayed in the same manner as described in Example 2, and the percentage conversion of L-histidine to urocanic acid is calculated therefrom. The results are shown in Table 6.

Table 6

| Reaction time (hr) | Conversion(%) to urocanic acid |
| --- | --- |
| 8 | 30 |
| 24 | 75 |
| 40 | 95 |
| 48 | 100 |

EXAMPLE 9

3 g of the microbial cells of *Achromobacter liquidum* IAM 1667 are suspended in 12 ml of a physiological saline solution. The suspension is heated at 70°C for 30 minutes. 30 mg of N,N'-methylene-bis(acrylamide), 0.9 ml of 0.112% N,N,N',N'-tetramethylethylenediamine and 0.1 ml of 2.5% ammonium persulfate are added to the suspension. Then, the suspension is allowed to stand at 37°C for 60 minutes. 21 g of the immobilized preparation of *Achromobacter liquidum* IAM 1667 are obtained.

21 g of the immobilized preparation of *Achromobacter liquidum* IAM 1667 are suspended in 500 ml of an aqueous 0.25 M L-histidine hydrochloride solution(pH 9.0). The suspension is stirred at 37°C for a certain period of time. The urocanic acid content in the suspension is assayed in the same manner as described in Example 2, and the percentage conversion of L-histidine to urocanic acid is calculated therefrom. The results are shown in Table 7.

Table 7

| Reaction time (hr) | Conversion(%) to urocanic acid |
| --- | --- |
| 8 | 40 |
| 24 | 80 |
| 40 | 100 |
| 48 | 100 |

EXAMPLE 10

3 g of the microbial cells of *Achromobcter liquidum* IAM 1667 are suspended in 12 ml of a physiological saline solution. The suspension is heated at 70°C for 30 minutes. 30 mg of N,N'-propylene-bis(acrylamide), 0.9 ml of 0.112% N,N,N',N'-tetramethyl-ethyenediamine and 0.1 ml of 0.25% ammonium persulfate are added to the suspension. Then, the suspension is allowed to stand at 37°C for 60 minutes. 26 g of the immobilized preparation of *Achromobacter liquidum* IAM 1667 are obtained.

26 g of the immobilized preparation of *Achromobacter liquidum* IAM 1667 are suspended in 500 ml of an aqueous 0.25 M L-histidine hydrochloride solution(pH 9.0). The suspension is stirred at 37°C for a certain period of time. The urocanic acid content in the suspension is assayed in the same manner as described in Example 2, and the percentage conversion of L-histidine to urocanic acid is calculated therefrom. The results are shown in Table 8.

Table 8

| Reaction time (hr) | Conversion(%) to urocanic acid |
| --- | --- |
| 8 | 30 |
| 24 | 80 |
| 40 | 95 |
| 48 | 100 |

EXAMPLE 11

3 g of the microbial cells of *Achromobacter liquidum* IAM 1667 are suspended in 12 ml of a physiological saline solution. The suspension is heated at 37°C for 30 minutes. 30 mg of bis(acrylamidomethyl)ether, 0.9 ml of 0.112% N,N,N',N'-tetramethyl-ethylenediamine and 0.1 ml of 2.5% ammonium persulfate are added to the suspension. Then, the suspension is allowed to stand at 37°C for 60 minutes. 25 g of the immobilized preparation of *Achromobacter liquidum* IAM 1667 are obtained.

25 g of the immobilized preparation of *Achromobacter liquidum* IAM 1667 are suspended in 500 ml of an aqueous 0.25 M L-histidine hydrochloride solution(pH 9.0). The suspension is stirred at 37°C for a certain period of time. The urocanic acid content in the suspension is assayed in the same manner as described in Example 2, and the percentage conversion of L-histidine to urocanic acid is calculated therefrom. The results are shown in Table 9.

Table 9

| Reaction time (hr) | Conversion(%) to urocanic acid |
| --- | --- |
| 8 | 35 |
| 24 | 80 |
| 40 | 100 |
| 48 | 100 |

What we claim is:

1. A process for preparing urocanic acid or a mixture of urocanic acid and D-histidine which comprises the steps of polymerizing at least one acrylic monomer in an aqueous suspension of an L-histidine ammonialyase-producing microoorganism to produce an immobilized L-histidine ammonialyase- producing microorganism, heating the L-histidine ammonialyase-producing microorganism to a temperature of 60° to 80°C either before or after immobilizing it, and subjecting the immbolized L-histidine ammonialyase-producing microorganism to enzymatic reaction with L-histidine, DL-histidine or an acid addition salt thereof in the presence of $10^{-4}$ to $10^{-1}$ M of at least one metal ion selected from the group consisting of calcium, magnesium, zinc and ferric ions.

2. The process of claim 1 in which the microorganism is heated before immobilizing it.

3. The process of claim 1 in which the microorganism is heated after it is immobilized.

4. The process of claim 1 in which the L-histidine ammonialyase-producing microorganism is selected from the group consisting of *Achromobacter aquatilis* OUT 8003, *Achromobacter liquidum* IAM 1667, *Agrobacterium radiobacter* IAM 1526, *Flavobacterium flavescens* IFO 3085 and *Sarcina lutea* IAM 1099.

5. The process of claim 1 in which the L-histidine ammonialyase-producing microorganism is *Achromobacter liquidum* IAM 1667.

6. The process according to claim 1 wherein the acrylic monomer is selected from the group consisting of acrylamide, N,N'-lower alkylene-bis-acrylamide and bis(acrylamidomethyl) ether.

7. The process of claim 1, in which the polymerization is carried out at 5° to 80°C in the presence of a polymerization initiator and a polymerization accelerator.

8. The process of claim 7, in which the polymerization initiator is selected from the group consisting of potassium persulfate, ammonium persulfate, vitamin $B_2$ and Methylene Blue, and the polymerization accelerator is selected from the group consisting of β- (dimethylamino)-propionitrile and N,N,N'N'-tetramethyl-ethylenediamine.

9. The process according to claim 1, wherein the enzymatic reaction is carried out at 0° to 60°C.

10. A process for preparing urocanic acid or a mixture of urocanic acid and D-histidine which comprises the steps of polymerizing N,N'-lower alkylene-bis-acrylamide or bis(acrylamidomethyl) ether in an aqueous suspension of an L-histidine ammonialyase-producing microorganism at 5° to 80°C in the presence of a polymerization initiator and a polymerization accelerator to produce an immobilized L-histidine ammonialyase-producing microorganism, heating the L-histidine ammonialyase-producing microorganism to a temperature of 60° to 80°C either before or after immobilizing it, and subjecting the immobilized L-histidine ammonialyase-producing microorganism to enzymatic reaction with L-histidine, DL-histidine or an acid addition salt thereof in the presence of $10^{-4}$ to $10^{-1}$ M of at least one metal ion selected from the group consisting of calcium, magesium, zinc and ferric ions.

11. The process of claim 10 in which the microorganism is heated before it is immobilized.

12. The process of claim 10 in which the microorganism is heated after it is immobilized.

13. The process according to claim 10, wherein the L-histidine ammonialyase-producing microorganism is selected from the group consisting of *Achromobacter aquatilis* OUT 8003, *Achromobacter liquidum* IAM 1667, *Agrobacterium radiobacter* IAM 1526, *Flavobacterium flavescens* IFO 3085 and *Sarcina lutea* IAM 1099.

14. The process according to claim 10, wherein the L-histidine ammonialyase-producing microorganism is *Achromobacter liquidum* IAM 1667.

15. The process according to claim 10, wherein the polymerization initiator is selected from the group consisting of potassium persulfate, ammonium persulfate, vitamin $B_2$ and Methylene Blue, and the polymerization accelerator is selected from the group consisting of β-(dimethylamino)-propionitrile and N,N,N',N'-tetramethyl-ethylenediamine.

16. A process for preparing urocanic acid or a mixture of urocanic acid and D-histidine which comprises the steps of copolymerizing acrylamide with N,N'-lower alkylene-bis-acrylamide or bis(a-crylamidomethyl) ether in an aqueous suspension of an L-histidine ammonialyase-producing microorganism at 5° to 80°C in the presence of a polymerization initiator and a polymerization accelerator to produce an immobilized L-histidine ammonialyase-producing microorganism, heating the immobilized L-histidine ammonialyase-producing microorganism at a temperature of 60° to 80°C either before or after immobilizing it, and subjecting the immobilized L-histidine ammonialyase-producing microorganism to enzymatic reaction with L-histidine, DL-histidine or an acid addition salt thereof in the presence of $10^{-4}$ to $10^{-1}$ M of at least one metal ion selected from the group consisting of calcium, magnesium, zinc and ferric ions.

17. The process of claim 16, in which the microorganism is heated before immobilization.

18. The process of claim 16 in which the microorganism is heated after immobilization.

19. The process according to claim 16, wherein the L-histidine ammonialyase -producing microorganism is selected from the group consisting of *Achromobacter aquatilis* OUT 8003, *Achromobacter liquidum* IAM 1667, *Agrobacterium radiobacter* IAM 1526, *Flavobacterium flavescens* IFO 3085 and *Sarcina lutea* IAM 1099.

20. The process according to claim 16, wherein the L-histidine ammonialyase-producing microorganism is *Achromobacter liquidum* IAM 1667.

21. The process according to claim 16, wherein the polymerization initiator is selected from the group consisting of potassium persulfate, ammonium persulfate, vitamin $B_2$ and Methylene Blue, and the polymerization accelerator is selected from the group consisting of β-(dimethylamino)-propionitrile and N,N,N',N'-tetramethyl-ethylenediamine.

* * * * *